(12) United States Patent
Yamashita et al.

(10) Patent No.: US 8,258,244 B2
(45) Date of Patent: Sep. 4, 2012

(54) PROCESS FOR PRODUCTION OF THERMOPLASTIC COPOLYMER

(75) Inventors: Taro Yamashita, Chiba (JP); Hajime Takamura, Tokyo (JP)

(73) Assignee: Toray Industries, Inc (JP)

(*) Notice: Subject to any disclaimer, the term of this patent is extended or adjusted under 35 U.S.C. 154(b) by 23 days.

(21) Appl. No.: 12/919,171

(22) PCT Filed: Feb. 27, 2009

(86) PCT No.: PCT/JP2009/053647
§ 371 (c)(1),
(2), (4) Date: Aug. 24, 2010

(87) PCT Pub. No.: WO2009/107765
PCT Pub. Date: Sep. 3, 2009

(65) Prior Publication Data
US 2010/0324231 A1    Dec. 23, 2010

(30) Foreign Application Priority Data

Feb. 28, 2008   (JP) .................... 2008-048301
Sep. 17, 2008   (JP) .................... 2008-238170

(51) Int. Cl.
C08F 2/00    (2006.01)
C08F 12/28   (2006.01)
C08F 14/06   (2006.01)
C08F 12/02   (2006.01)

(52) U.S. Cl. .......... 526/64; 526/344; 526/310; 526/346

(58) Field of Classification Search .............. 526/64, 526/344, 310, 346
See application file for complete search history.

(56) References Cited

U.S. PATENT DOCUMENTS
2008/0119624 A1    5/2008   Mihan et al.

FOREIGN PATENT DOCUMENTS

| CN | 1856356 | 11/2006 |
| EP | 0541797 | * 12/1990 |
| EP | 0541797 A1 | 5/1993 |
| JP | 61-162507 A | 7/1986 |
| JP | 62-250015 A | 10/1987 |
| JP | 3-205411 A | 9/1991 |
| JP | 4-318007 A1 | 11/1992 |
| JP | 6-263942 A | 9/1994 |

OTHER PUBLICATIONS

International Search Report in related application PCT/JP2009/053647 mailed May 19, 2009.
Supplementary European Search Report in related European Application No. EP09715593 mailed Jan. 24, 2011.

* cited by examiner

*Primary Examiner* — William Cheung
(74) *Attorney, Agent, or Firm* — Pillsbury Winthrop Shaw Pittman LLP; Raj S. Dave

(57) ABSTRACT

Disclosed is a process for producing a thermoplastic copolymer, which comprises step of supplying a monomer mixture (a) to a loop reactor continuously to produce a copolymer (A), the monomer mixture (a) comprising an aromatic vinyl monomer (a1), a vinyl cyanide monomer (a2) and an N-substituted maleimide monomer (a3). The process enables the production of a thermoplastic copolymer which has an excellent balance among physical properties such as heat resistance, color and flow property, reduces the amount of bleeding that may cause mold staining during molding processing and has excellent handleability and productivity.

11 Claims, 1 Drawing Sheet

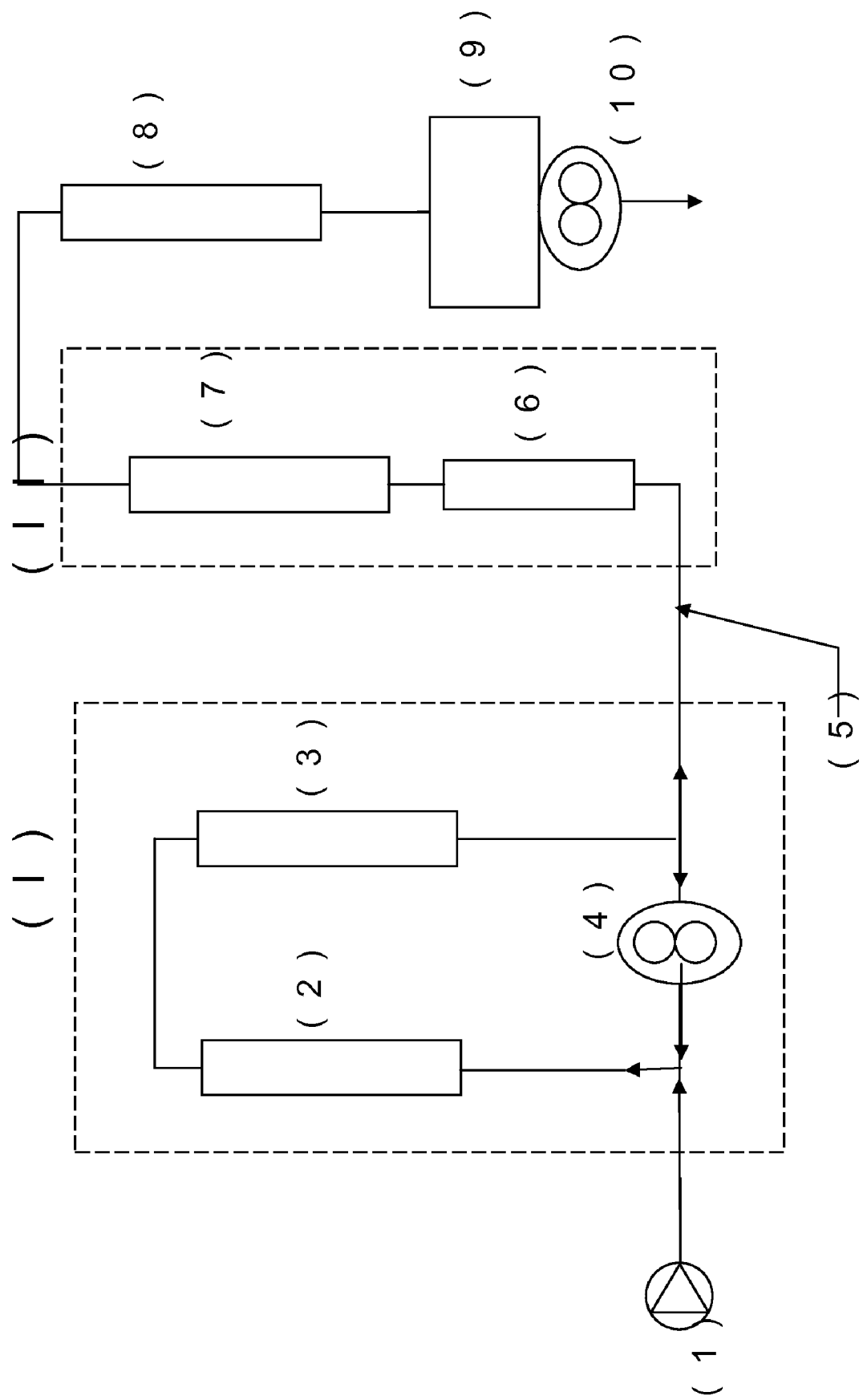

PROCESS FOR PRODUCTION OF THERMOPLASTIC COPOLYMER

CROSS REFERENCE TO RELATED APPLICATIONS

This application is a U.S. National phase of International Application No. PCT/JP2009/053647, filed Feb. 27, 2009, which in turn claims priority to Japanese Patent Application No. 2008-048301, filed on Feb. 28, 2008 and Japanese Patent Application No. 2008-238170, filed on Sep. 7, 2008. The contents of each of which are incorporated herein by reference in their entirety.

TECHNICAL FIELD

The present invention relates to a process for production of a thermoplastic copolymer which has an excellent balance among properties such as heat resistance and color and has excellent molding processability and productivity.

BACKGROUND ART

Styrene-based resins represented by rubber-reinforcement styrene-based resin have been used in a wide range of fields including domestic electric appliances, office automation machines, and general merchandise, because the styrene-based reins have excellent mechanical properties, molding processability, and appearance trait. Furthermore, heat resistance can be provided to the rubber-reinforcement styrene-based resin by copolymerization with a moderate amount of N-phenyl maleimide represented by an N-substituted maleimide based monomer, and the thus obtained heat resistance resin has been used in car interior and exterior parts and domestic electric appliances.

As a method for copolymerizing such an N-substituted maleimide, a method disclosed in Patent Document 1 has been proposed. However, this method is not able to achieve a homogeneous resin composition distribution, is inferior in color and mechanical strength, and achieves insufficient effect of improvement in heat resistance.

In addition, as a method for obtaining the copolymer with a homogeneous composition distribution, various proposals such as in Patent Document 2 have been made. However, how to add a vinyl-based monomer has only been considered, improvements such as fundamental reexamination of the polymerization method have not been made. In addition, Patent Document 3 discloses a production method in accordance with continuous solution polymerization. However, while this method achieves a homogeneous copolymer composition distribution, the method is disadvantageous in that it is not possible to obtain a copolymer which has high heat resistance and includes less remaining phenyl maleimide. When a monomer containing a large amount of phenyl maleimide is supplied in order to improve the heat resistance, all of the phenyl maleimide is not reacted for polymerization, thus leaving the unreacted phenyl maleimide as remaining phenyl maleimide. Furthermore, the remaining phenyl maleimide causes oligomers to be generated in volatile removing apparatus and causes the composition distribution of the polymer to be made wider. The wider composition distribution of the thermoplastic resin and the remaining phenyl maleimide cause oily substances (bleed) in injection molding. A large amount of bleeding causes notable mold staining, and it is then necessary to stop the automatic production for the purposes of removing the bleed and cleaning the mold, in line with the progress of continuous injection molding, thereby decreasing the efficiency. Besides the remaining phenyl maleimide, residual from a polymerization initiator and a chain transfer agent as polymerization aids also causes a nonhomogeneous composition distribution and an increase in bleeding, and it is thus necessary to minimize the usages of the polymerization aids. However, no reference has been reported in which an approach for minimizing the usages is disclosed.

In addition, the phenyl maleimide monomer itself exhibits a yellow color. Thus, the phenyl maleimide monomer causes coloring of the produced polymer, and there is even a possibility that the phenyl maleimide monomer causes problems in terms of handleability such as scaling or caking in piping during the process for production, because the phenyl maleimide is a solid monomer.

As a method for reducing the remaining phenyl maleimide, it is necessary to progress the polymerization as much as possible for incorporation into the polymer chain. However, the polymer with a high degree of polymerization has poor polymerization stability, and is not able to be produced in a stable manner or an economically advantageous manner.

[Patent Document 1] Japanese Patent Application Laid-Open No. 62-50357

[Patent Document 2] Japanese Patent Application Laid-Open No. 58-162616

[Patent Document 3] Japanese Patent Application Laid-Open No. 61-276807

DISCLOSURE OF THE INVENTION

Problems to be Solved by the Invention

The present invention has been achieved as a result of considering solutions for the problems in the prior art described above. An object of the present invention is to provide a method for producing a thermoplastic copolymer in a styrene-based resin produced by copolymerization of an N-substituted maleimide, which also has heat resistance for the resin, has excellent color, achieves a reduction in bleeding that may cause mold staining, with the homogeneous composition distribution and through a reduction in remaining phenyl maleimide, has no problems in terms of the process for production, has a limited amount of a polymerization initiator and a chain transfer agent to be added, and has excellent productivity.

Means for Solving the Problems

The inventors have found out, as a result of their earnest considerations of means for solving the problems described above, a method for producing a thermoplastic copolymer, which has not been able to be achieved by conventional findings, from a production method comprising the step of supplying a monomer mixture (a) to a loop reactor to produce a copolymer (A), wherein the monomer mixture (a) comprises an aromatic vinyl monomer (a1), a vinyl cyanide monomer (a2) and an N-substituted maleimide monomer (a3). The thermoplastic copolymer also has heat resistance for the resin, has an excellent color and a homogeneous composition distribution, and has excellent handleability and productivity.

More specifically, the present invention provides a process for producing a thermoplastic copolymer, which comprises the step of supplying a monomer mixture (a) to a loop reactor continuously to produce a copolymer (A), wherein the monomer mixture (a) comprises an aromatic vinyl monomer (a1), a vinyl cyanide monomer (a2) and an N-substituted maleimide monomer (a3).

Effect of the Invention

According to the present invention, for example, a thermoplastic copolymer can be obtained which has an excellent balance among physical properties such as impact resistance. In addition, according to the present invention, the composition distribution of the monomers in the resin can be made homogeneous, and the amount of remaining phenyl maleimide can be reduced. Thus, a thermoplastic copolymer can be obtained which has a resin color improved and has bleeding reduced. In addition, the present invention can avoid problems in terms of handleability, such as scaling and caking in piping, which are particular process problems for phenyl maleimide systems, and allows a polymer with a high degree of polymerization to be produced with high productivity in an industrially advantageous manner.

In addition, the thermoplastic copolymer obtained in accordance with the method for producing a thermoplastic copolymer according to the present invention is blended with an AS resin or an ABS resin and extruded, and used as a heat resistant ABS resin composition, and the heat resistant ABS resin composition is widely used in car interior and exterior parts and domestic electric appliances, because the thermoplastic copolymer can reduce bleeding that may cause staining during molding processing with an improvement of the injection molding efficiency, without damaging the balance among physical properties such as the color, heat resistance, and flow property of the heat resistant ABS resin composition.

BRIEF DESCRIPTION OF THE DRAWING

FIG. 1 is a process diagram illustrating an example of a continuous polymerization line of a continuous polymerization apparatus incorporating tubular reactors with a structure for static mixing (hereinafter called "static mixing structure") therein.

DESCRIPTION OF REFERENCE SYMBOLS

| | |
|---|---|
| (1): | plunger pump |
| (2): | tubular reactor with a static mixing structure therein |
| (3): | tubular reactor with a static mixing structure therein |
| (4): | gear pump |
| (5): | side line |
| (6): | tubular reactor with a static mixing structure therein |
| (7): | tubular reactor with a static mixing structure therein |
| (8): | preheater |
| (9): | volatilizing apparatus |
| (10): | gear pump |
| (I): | loop reactor |
| (II): | plug flow reactor |

BEST MODE FOR CARRYING OUT THE INVENTION

A process for producing a thermoplastic copolymer according to the present invention will be described in detail below.

The present invention provides a process for producing a thermoplastic copolymer, which comprises the step of supplying a monomer mixture (a) to a loop reactor continuously to produce a copolymer (A), wherein the monomer mixture (a) comprises an aromatic vinyl monomer (a1), a vinyl cyanide monomer (a2) and an N-substituted maleimide monomer (a3).

In the present invention, the copolymer (A) is a copolymer composed of the monomer mixture (a) comprising the aromatic vinyl monomer (a1), the vinyl cyanide monomer (a2), and the N-substituted maleimide monomer (a3).

While the aromatic vinyl monomer (a1) in the monomer mixture (a) may be styrene, α-methylstyrene, p-methylstyrene, vinyltoluene, t-butylstyrene, o-ethylstyrene, o-chlorostyrene, o,p-dichlorostyrene, or a mixture of two or more of these monomers, styrene or α-methylstyrene is preferably used.

While the vinyl cyanide monomer (a2) may be acrylonitrile, methacrylonitrile, ethacrylonitrile, or a mixture of two or more of these monomers, acrylonitrile is preferably used.

While the N-substituted maleimide monomer (a3) may be N-methyl maleimide, N-cyclohexyl maleimide, N-phenyl maleimide, or a mixture of two or more of these monomers, N-phenyl maleimide is preferably used.

In the present invention, the monomer mixture (a) may contain another monomer (a4) in addition to the aromatic vinyl monomer (a1), the vinyl cyanide monomer (a2), and the N-substituted maleimide monomer (a3). The monomer (a4) may be an unsaturated carboxylic acid such as an acrylic acid and a metacrylic acid, an unsaturated dicarboxylic acid such as a maleic acid, an unsaturated dicarboxylic acid anhydride such as a maleic anhydride, an unsaturated amide such as an acrylamide, or a mixture of two or more of these monomers.

In the present invention, while the ratio of each monomer component in the monomer mixture (a) is not particularly limited, it is preferable that the aromatic vinyl monomer (a1), the vinyl cyanide monomer (a2), and the N-substituted maleimide monomer (a3) are contained respectively at 20 to 80 weight %, 3 to 30 weight %, and 10 to 50 weight %, in terms of the balance among physical properties of heat resistance, impact resistance, and rigidity of the copolymer (A). In addition, it is also preferable to further add to the monomers (a1) to (a3), 0 to 50 weight % of another monomer (a4) which can be copolymerized with the monomers (a1) to (a3). In the present invention, the monomer mixture (a) contains, more preferably, 30 to 70 weight % of the aromatic vinyl monomer (a1), 3 to 20 weight % of the vinyl cyanide monomer (a2), 20 to 45 weight % of the N-substituted maleimide monomer (a3), and 0 to 50 weight % of the monomer (a4) which can be copolymerized with the monomers (a1) to (a3), and even more preferably, contains 40 to 60 weight % of the aromatic vinyl compound unit (a1), 8 to 15 weight % of the vinyl cyanide compound unit (a2), and 30 to 45 weight % of the N-substituted maleimide unit (a3). It is to be noted that while the monomer (a4) may be added to the monomer mixture (a), in that case, it is preferable to blend the monomer (a4) at 0 to 50 weight %.

In the present invention, it is preferable to add the monomer mixture (a) described above in the process of continuous bulk polymerization or continuous solution polymerization.

In the case of selecting continuous solution polymerization as the polymerization process of the monomer mixture (a), in addition to the monomers mentioned above, a solvent is used at preferably 1 to 50 parts by weight, more preferably 1 to 30 parts by weight, even more preferably 1 to 20 parts by weight with respect to 100 parts by weight of the monomer mixture (a). The solvent used can contain water from saturation. In the case of using the solvent, the solvent may be, for example, hydrocarbon system solvents such as toluene, ethylbenzene, and xylene, and polar solvents such as methyl ethyl ketone, methyl isobutyl ketone, butyl alcohol, and tetrahydrofuran. Among these solvents, the polar solvents are preferable, more preferably, solvents with a ketone group such as methyl ethyl ketone and methyl isobutyl ketone, and even more preferably, methyl ethyl ketone in terms of the solubility of the copolymer (A).

In the present invention, the copolymer (A) is obtained by supplying the monomer mixture (a) to a loop reactor continuously for polymerization. The loop reactor is preferably, a circulation line in which there are one or more tubular reactors which have therein a static mixing structure. In the method for producing a thermoplastic copolymer according to the present invention, the loop reactor includes a tubular reactor which has therein a static mixing structure, thus increasing the surface area for internal heat exchange and achieving high heat conduction. In addition, in the loop reactor incorporating one or more tubular reactors which have therein a static mixing structure, bulk polymerization or solution polymerization is carried out while carrying out static mixing through the tubular reactor, thereby allowing continuous polymerization in high polymer concentration regions to be achieved, which has not been able to be achieved in the past. This allows an exothermic polymerization reaction to be developed which is extremely rigid under heat control, without fear of formation of hot spots. More preferably, the hydrostatic mixer has a multiple-unit curved tube. The heat transfer area per unit volume of the tubular reactor is preferably 10 $m^2/m^3$ or more, more preferably 30 $m^2/m^3$ or more, even more preferably 50 $m^2/m^3$ or more.

In addition, the tubular reactor which has therein a static mixing structure is preferably a reactor in which a liquid heat transfer medium flows through an internal coil of the structure for hydrostatic mixture, for the purpose of increasing the effective reaction volume. These reactors are used either alone or with one another, and if necessary, two or more types of reactors can be combined.

The tubular reactor which has therein a static mixing structure is preferably a tubular reactor which has therein a static mixing element. The mixing element may be, for example, a mixing element which divides the flow of a polymerization solution flowing into a tube and changes the direction of the flow, and repeats the division and confluence, thereby forming a turbulent flow to mix the polymerization solution.

Specific examples of the tubular reactor which has therein a static mixing element include tubular reactors which have therein SMX-type or SMR-type Sulzer tubular mixers, Kenics static mixers, Toray tubular mixers, or the like, and tubular reactors which have therein SMX-type or SMR-type Sulzer tubular mixers are preferable.

In the practice of the present invention, when the flow rate of a mixture solution refluxed in the loop reactor is denoted by F1 (liter/time) whereas the flow rate of a mixture solution flowing out from the loop reactor is denoted by F2 (liter/time), the reflux ratio (R=F1/F2) preferably falls within the range of 5 to 30. In the range of 5 to 30 for the reflux ratio, homogeneous mixing is possible, and homogeneous polymerization solutions are thus obtained. If the reflux ratio is less than 5, the degree of polymerization will have a distribution produced in the loop reactor, and low molecular weight polymers or oligomers which cause bleeding will be likely to be produced. Alternatively, if the reflux ratio is over 30, the residence time in the loop reactor will be longer and at risk for polymerization runaway, and large-scale equipment investment will be required because a large amount of polymerization solution is to be circulated.

In the present invention, the pressure within the tubular reactor is preferably the vapor pressure of the reaction solution or more. Keeping the vapor pressure of the reaction solution or more within the tubular reactor can suppress foaming of the reaction solution, and prevent obstruction due to the foaming. In addition, the upper and lower limits of the pressure within the tubular reactor derive from the quality of the metal material of the reactor and the structure of the static mixing element, and are preferably 1 to 50 $kg/cm^2G$.

In the present invention, in order to regulate the flow rate of the mixture solution refluxed in the loop reactor, a circulation pump can be provided in the loop reactor. For the circulation pump used herein, a known gear pump is preferably used to regulate the flow rate of the polymerization solution, because the viscosity of the polymerization solution is high.

The viscosity of the polymerization solution of the copolymer (A) in the loop reactor is preferably 50 to 3000 Poise, and more preferably 100 to 2000 Poise. If the viscosity is less than 50 Poise, the stability of solution pumping for circulation will be decreased, and in particular, when the SMX-type or SMR-type Sulzer tubular mixers are used, there is a possibility that the complete mixing flow will not be able to be kept. If the viscosity is over 3000 Poise, the viscosity of the polymerization solution in the reactor will be increased, possibly leading to breakdown of the circulation pump or supply pump for keeping the complete mixing flow.

In the present invention, the polymerization temperature in the loop reactor is preferably 70 to 120° C., more preferably 90 to 115° C. The polymerization temperature of 70 to 120° C. results in excellent productivity, sufficient reduction in the unreacted N-substituted maleimide monomer (a3) in the monomer mixture (a), and excellent production stability. In the present invention, the average residence time of the monomer mixture (a) in the loop reactor is determined by the targeted degree of polymerization, the polymerization temperature, the type and usage of an initiator, and preferably falls within the range of 0.5 to 4 hours, more preferably within the range of 0.75 to 3 hours. When the average residence time in the loop reactor is 0.5 to 4 hours, the polymerization control is stabilized, and a resin composition with a homogeneous composition can be produced.

In the present invention, the inner wall temperatures of the tubular reactors used for the loop reactor are preferably 70 to 120° C., more preferably 90 to 115° C. In addition, the tubular reactors used for the loop reactor can all have the same inner wall temperature, or the inner wall temperature can be varied for each tubular reactor.

The copolymer (A) can be produced by thermal polymerization with or without the use of polymerization initiators, and further can be produced by a combination of thermal polymerization and polymerization with the initiator. As the polymerization initiator, peroxides, azo-based compounds, and the like are preferably used.

Specific examples of the peroxides include benzoyl peroxide, cumene hydroperoxide, dicumyl peroxide, diisopropylbenzene hydroperoxide, t-butyl hydroperoxide, t-butylcumyl peroxide, t-butyl peroxy acetate, t-butyl peroxy benzoate, t-butyl peroxy isopropyl carbonate, di-t-butyl peroxide, t-butyl peroctoate, 1,1-bis(t-butyl peroxy)3,3,5-trimethyl cyclohexane, 1,1-bis(t-butyl peroxy)cyclohexane, and t-butyl peroxy-2-ethylhexanoate and the like.

In addition, specific examples of the azo-based compounds include azobisisobutylonitorile, azobis(2,4dimethylvaleronitrile), 2-phenylazo-2,4-dimethyl-4-methoxyvaleronitrile, 2-cyano-2-propylazoformamide, 1,1'-azobiscyclohexane-1-carbonitrile, azobis(4-methoxy-2,4-dimethylvaleronitrile), dimethyl2,2'-azobisisobutylate, 1-t-butylazo-1-cyanocyclohexane, 2-t-butylazo-2-cyanobutane, and 2-t-butylazo-2-cyano-4-methoxy-4-methylpentane and the like.

Among these, compounds for which the temperature for the half-life of 10 hours is 70° C. to 120° C. are preferable, more preferably 80° C. to 100° C., as the polymerization initiator, and a peroxide-based polymerization initiator, 1,1'-bis(t-butylperoxy)cyclohexane is particularly used preferably.

While the amount of the added polymerization initiator is typically 0 to 1 parts by weight with respect to 100 parts by weight of the monomer mixture (a), the use of the hydrostatic mixing reactor in which the liquid heat transfer medium flows through an internal coil allows the polymerization reaction to be controlled by the temperature of the liquid medium rather than the polymerization initiator, thus allowing the amount of the added initiator to be significantly reduced. Preferably, for the purpose of reducing the remaining initiator, the amount of the added polymerization initiator is 0 to 0.1 parts by weight, more preferably 0 to 0.05 parts by weight.

In the case of using these polymerization initiators, one of the polymerization initiators can be used, or two or more of the polymerization initiators can be used in combination. In the case of using two or more of the polymerization initiators, it is preferable to use the polymerization initiators between which the difference in the temperature for the half-life of 10 hours is 5° C. or more. This allows the polymerization to be progressed efficiently.

In addition, for the purpose of adjusting the degree of polymerization for the copolymer (A), it is preferable to add a chain transfer agent such as an alkyl mercaptan, carbon tetrachloride, carbon tetrabromide, dimethylacetoamide, dimethylformamide, or triethylamine. Preferable alkyl mercaptans for use in the present invention include, for example, n-octyl mercaptan, t-dodecyl mercaptan, n-dodecyl mercaptan, n-tetradecyl mercaptan, and n-octadecyl mercaptan, and above all, n-octyl mercaptan, t-dodecyl mercaptan, or n-dodecyl mercaptan is preferably used as a chain transfer agent. In the case of using these chain transfer agents, one of the chain transfer agents can be used, or two or more of the chain transfer agents can be used in combination.

In the step of supplying the monomer mixture (a) continuously to the loop reactor to produce the copolymer (A), it is preferable to add the chain transfer agent on the order of 0.05 to 0.5 parts by weight with respect to 100 parts by weight of the monomer mixture. For the purpose of reducing the amount of the remaining chain transfer agent, the amount of the added chain transfer agent is more preferably 0.05 to 0.3 weight %.

Furthermore, for the polymerization, known plasticizers, thermal stabilizers, antioxidants, light stabilizers, etc. may be added if necessary.

In the present invention, in the step of supplying the monomer mixture (a) continuously to the loop reactor to produce the copolymer (A), the degree of polymerization for the copolymer (A) is preferably 30 to 80 weight %, and the degree of polymerization for the copolymer (A) is more preferably 40 to 75 weight %.

In the present invention, preferably, the monomer mixture (a) is supplied continuously to the loop reactor to produce the copolymer (A), and then supplied continuously to and reacted in an extrusion flow reactor composed of one or more tubular reactors with the static mixing structure therein, until the degree of polymerization for the copolymer (A) is 50 to 90 weight %.

In the present invention, preferable examples of the extrusion flow reactor include a plug flow reactor. In the present invention, the polymerization promoted in the plug flow reactor allows the final polymer content rate (degree of polymerization) to be increased to reduce the amount of N-phenyl maleimide introduced in the volatile removal step subsequently carried out, and thus has substantial industrial merit as an economically advantageous producing method.

As the plug flow reactor, a variety of tubular, tower, and horizontal reactors, etc. can be used. In addition, Kneader reactors, twin screw extruder, etc. can be used as the polymerization reactor. These reactors are used either alone or with one another, and if necessary, two or more types of reactors can be used in combination. Above all, it is preferable to use, as the plug flow reactor, a serial plug flow reactor composed of one or more tubular reactors which have therein a static mixing structure. It is to be noted that while the specification of the tubular reactor used in the loop reactor is preferably applied to the tubular reactor with a static mixing structure therein, which is preferably used as the extrusion flow reactor, it is not necessary to apply the same specification.

In the present invention, the operation of extracting the copolymer (A) from the loop reactor and sending the extracted copolymer (A) to the extrusion flow reactor can be carried out with the use of, for example, a pump. The pump is preferably a commercial gear pump. The extraction of the reaction solution through the pump can send the reaction solution stably toward the next step, and increase the pressure in the subsequently placed extrusion flow reactor to the vapor pressure of the reaction solution or more.

The viscosity of the copolymer (A) in the extrusion flow reactor is preferably 50 to 5000 Poise, and more preferably 300 to 4000 Poise. If the viscosity is less than 50 Poise, there is a possibility it will be difficult to mix the polymerization solution by dividing the flow of a polymerization solution flowing into a tube and changing the direction of the flow, and repeating the division and confluence, thereby forming a turbulent flow, in particular, when the SMX-type and SMR-type Sulzer tubular mixers are used. Alternatively, if the viscosity is over 5000 Poise, the viscosity of the polymerization solution in the reactor will be increased, resulting in the inability to send the polymerization solution toward the next step, and possibly leading to breakdown of the tubular mixers.

The extrusion flow reactor is preferably disposed in series with the loop reactor. In addition, the polymerization temperature in the extrusion flow reactor is preferably 70 to 200° C., more preferably 90 to 180° C., and even more preferably 100 to 160° C. The polymerization temperature of 70 to 200° C. provides excellent productivity, sufficiently reduces the unreacted N-substituted maleimide monomer (a3), and avoids adhesion of the polymer as scale to the static mixing structure.

The content rate of the copolymer (A) in the polymer solution obtained from the extrusion flow reactor is preferably 50 to 90 weight %, more preferably 60 to 90 weight %, and even more preferably 60 to 85 weight %. The content rate allows the N-substituted maleimide monomer (a3) in the polymer solution obtained from the extrusion flow reactor to be 1.0% or less, preferably 0.5% or less, and more preferably 0.2% or less.

In the present invention, preferably, the weight average molecular weight (hereinafter, also referred to as Mw) of the copolymer (A) after the step of reacting in the extrusion flow reactor until the degree of polymerization for the copolymer (A) is 50 to 90 weight % is controlled to 30,000 to 150,000, more preferably 50,000 to 130,000, and even more preferably 80,000 to 120,000. It is to be noted that the weight average molecular weight used in the present invention refers to the weight average molecular weight in terms of absolute molecular weight measured by multi-angle light scattering gel permeation chromatography (GPC-MALLS). From the standpoint that the copolymer (A) is melted and blended with an ABS resin and from the standpoint of flow property, the upper limit of Mw is preferably 150,000, and more preferably 130,000. In addition, the lower limit of Mw is preferably 30,000, and more preferably 50,000 from the standpoints of impact resistance and melt residence stability.

In addition, in the present invention, a continuous bulk polymerization process or a continuous solution polymerization process is selected in the step of reacting in extrusion flow reactor until the degree of polymerization for the copolymer (A) is 50 to 90 weight %, thereby progressing the polymerization reaction in substantially homogeneous mixing, and allowing copolymers with a relatively homogeneous molecular weight distribution to be obtained. The molecular weight distribution (weight average molecular weight Mw/number average molecular weight Mn) for the copolymer (A) is preferably in the range of 2 or less, and in a more preferable aspect, in the range of 1.9 or less. When the weight average molecular weight Mw/number average molecular weight Mn is 2 or less, the thermoplastic copolymer obtained tends to have excellent molding processability, and can be thus preferably used. It is to be noted that the molecular weight distribution (Mw/Mn) used in the present invention refers to the numerical value calculated from the weight average molecular weight (Mw) and number average molecular weight (Mn) in terms of absolute molecular weight measured by multi-angle light scattering gel permeation chromatography (GPC-MALLS).

In the present invention, the inner wall temperatures of the tubular reactors in the extrusion flow reactor are preferably 70 to 200° C., more preferably 90 to 180° C., and even more preferably 100 to 160° C. The tubular reactors used for the extrusion flow reactor can all have the same inner wall temperature, or the inner wall temperature can be varied for each tubular reactor.

In the present invention, the average residence time of the reaction solution in the extrusion flow reactor preferably falls within the range of 0.01 to 60 minutes, more preferably 0.1 to 45 minutes. The average residence time of the reaction solution in the tubular reactor from 0.01 to 60 minutes is preferable, because the degree of polymerization can be sufficiently increased, the thermal stability of the finally obtained thermoplastic copolymer (A) is improved, and the productivity is also improved.

In the present invention, a vinyl-based monomer mixture (b), and various organic solvents, polymerization initiators, chain transfer agents, antioxidants, and thermal stabilizers can be supplied to the extrusion flow reactor, in addition to the polymerization solution from the loop reactor at the previous stage. The monomer component constituting the vinyl-based monomer mixture (b) to be supplied to the extrusion flow reactor is preferably a vinyl-based monomer mixture composed of an aromatic vinyl compound unit (b1), a vinyl cyanide compound unit (b2), an N-substituted maleimide unit (b3), and another monomer (b4) which can be copolymerized with these units, and may have the same as or a different composition from that of the monomer mixture (a). The amount of the supplied vinyl-based monomer mixture (b) is 0 to 30 weight %, and preferably 0 to 20 weight % with respect to 100 weight % of the monomer mixture (a).

For the organic solvent to be supplied to the extrusion flow reactor, the same organic solvent as the organic solvent supplied to the extrusion flow reactor is desirably used in terms of ease of volatile separation. The amount of the organic solvent supplied to the noncyclic line using one or more tubular reactors with a static mixing structure therein is 0 to 30 parts by weight, and preferably 0 to 20 parts by weight with respect to 100 parts by weight of the monomer mixture (a).

Polymerization initiators, chain transfer agents, antioxidants, and thermal stabilizers can be timely mixed into the monomer mixture (b) and organic solvent supplied to the extrusion flow reactor. The antioxidants include hindered phenols, sulfur containing organic compounds, and phosphorus containing organic compounds and the like, the thermal stabilizers include phenols and acrylates and the like. The amount of the supplied antioxidant or thermal stabilizer is preferably 0 to 2 weight % with respect to the monomer mixture (a). As the method for adding the antioxidant or thermal stabilizer, for example, preferably used is a method of adding the antioxidant or thermal stabilizer from a side line provided at an inlet of a tubular reactor of the extrusion flow reactor, or a method of introducing the antioxidant or thermal stabilizer into a tubular reactor after preparatory mixing in a separate static mixer disposed serially at an inlet of the tubular reactor.

A method for producing the copolymer (A) according to the present invention preferably comprises the steps of supplying a solution containing the copolymer (A) obtained as described above to a continuous volatilizing apparatus, and carrying out volatilizing continuously under a reduced pressure with a pressure of 200 Torr or less at a temperature of 100° C. or more and less than 300° C. to separate and remove the unreacted raw material mixture from the copolymer (A).

The volatilizing at the volatilizing temperature of 100° C. or more and less than 300° C. in the volatilizing step removes the unreacted monomer or the organic solvent which is the polymerization solvent, and as a result, improves the thermal stability and product quality of the obtained thermoplastic copolymer (A). More preferably, the volatilizing temperature is 120° C. or more and less than 280° C.

In the volatilizing step, under the condition of the reduced pressure with a pressure of 200 Torr or less, the unreacted monomer or the mixture of the unreacted monomer and the polymerization solvent can be efficiently separated and removed, causing no decrease in the thermal stability or quality of the obtained thermoplastic copolymer (A). More preferably, the pressure is 100 Torr or less, further preferably 50 Torr or less. It is to be noted that the lower limit of the pressure is preferably 0.1 Torr.

The smaller amount of the remaining monomers after the volatilizing step is preferable from the standpoints of thermal stability and product quality. To cite specific numerical values, the aromatic vinyl monomer is preferably 1.0% or less, and more preferably 1000 ppm or less, the vinyl cyanide compound unit is preferably 500 ppm or less, and more preferably 100 ppm or less, the N-substituted maleimide unit is preferably 100 ppm or less, and more preferably 50 ppm or less, and the organic solvent is preferably 1000 ppm or less, more preferably 500 ppm or less.

As the continuous volatilizing apparatus for carrying out the volatilizing, there are a method of removing volatile components from a vent port at a normal pressure or a reduced pressure on heating with the use of a single screw or twin screw extruder with the vent, a method of removing volatile components with the use of an evaporator with, for example, a centrifugal-type plate-fin heater built in a drum, a method of removing volatile components with, for example, a centrifugal-type thin film evaporator, and a method of removing volatile components by flushing into a vacuum chamber through preheating and foaming with the use of a multitubular heat exchanger, etc., and any of these methods can be used. The continuous volatilizing apparatus for carrying out the volatilizing is able to suppress, in particular, thermal decomposition of the copolymer, and the method is preferable of removing volatile components by flushing into a vacuum chamber through preheating and foaming with the use of a multitubular heat exchanger requiring an inexpensive plant cost. The average residence time in the continuous volatilizing apparatus is 5 to 60 minutes, and more preferably 10 to 45 minutes. It is also possible to use two or more continuous volatilizing apparatuses as described above.

In the present invention, the rate of generating the copolymer (A) from the monomer mixture (a) is preferably 10%/h or more. If the polymer generation rate is less than 10%/h, the productivity may be decreased, reducing the merit of the continuous polymerization. It is to be noted that the polymer generation rate is more preferably 20%/h or more, and further preferably 40%/h.

The unreacted monomer or the mixture of the unreacted monomer and the organic solvent, which is removed in the volatilizing step described above, is preferably collected, and all recycled in the polymerization step. Since the volatile components are vaporized by heating under reduced pressure in the volatilizing step, the volatile components are collected in their liquid states through a known cooling apparatus such as a still with a capacitor, as the method for collecting the volatile components, thereby allowing the volatile components to be all recycled directly in the polymerization step. In addition, the volatile components collected in their liquid states can also be distilled and purified with the use of a known distillation apparatus, and then recycled in the polymerization step.

Further, in the present invention, since the N-substituted maleimide monomer (a3) contained in the copolymer (A) solution obtained from the extrusion flow reactor is 1.0% or less, it is possible to remedy olygomer generation in the volatile removing apparatus and nonhomogeneous polymer composition distribution. In addition, the polymerized melt with the volatile components of the copolymer (A) removed can be extruded into particles, thereby obtaining a pellet of the copolymer (A), and the N-substituted maleimide monomer (a3) of the obtained copolymer (A) is almost totally consumed prior to the volatilizing step. Thus, the yellow color derived from the N-substituted maleimide monomer is resolved, and the pellet YI becomes 50 or less, and more preferably 40 or less.

In the copolymer (A) obtained in accordance with the method for producing the thermoplastic copolymer according to the present invention, the aromatic vinyl unit is 20 to 80 weight %, the vinyl cyanide unit is 3 to 30 weight %, and the N-substituted maleimide unit is 10 to 50 weight %, and more preferably, the aromatic vinyl unit is 30 to 70 weight %, the vinyl cyanide unit is 5 to 20 weight %, and the N-substituted maleimide unit is 30 to 45 weight %

Next, the polymerization method for the copolymer (A) with the use of the continuous polymerization line described above will be specifically described as an example with reference to a process diagram in FIG. 1. A loop reactor illustrated in the process diagram in FIG. 1 is an example of the loop reactor for use in the present invention. In the process diagram in FIG. 1, a plug flow reactor is used as the extrusion flow reactor composed of one or more tubular reactors with a static mixing structure therein.

A plunger pump (1) feeds raw material monomers, a radical initiator, and a solvent to a loop reactor (I) including tubular reactors (2), (3) with a static mixing structure therein and a gear pump (4). In the loop reactor, polymerization is progressed while circulating the polymerization solution, and some of the polymerization solution is fed to the plug flow reactor (II). In this case, the ratio between the flow rate of the polymerization solution circulated in the loop reactor and the flow rate of the polymerization solution flowing out into the plug flow reactor, the reflux ratio R, R=F1/F2 preferably falls within the range of 5 to 30 typically, when the flow rate of a mixture solution refluxed in the loop reactor (I), rather than flowing out into the plug flow reactor (II), is denoted by F1 (liter/time) whereas the flow rate of a mixture solution flowing out from the loop reactor into the plug flow reactor (II) is denoted by F2 (liter/time). Furthermore, the vinyl-based monomer mixture (b), and various organic solvents, polymerization initiators, chain transfer agents, antioxidants, and thermal stabilizer can be introduced from a side line (5) located in the connecting section from the loop reactor toward the plug flow reactor.

Next, the polymerization solution flowing out into the plug flow reactor (II) passes though tubular reactors (6), (7) with a static mixing structure therein, thereby further progressing the polymerization. The increase of the final polymer content rate (the degree of polymerization) allows the amount of N-phenyl maleimide introduced in a volatile removal step subsequently carried out to be reduced.

Then, the polymerization solution is fed to a preheater (8) and a volatilizing apparatus (9), from which the unreacted polymers, the solvent, and the like are removed under reduced pressure, and then discharged from a gear pump (10) and formed into a pellet, thereby obtaining an intended copolymer (A).

The thermoplastic copolymer obtained in the present invention is blended with an AS resin or an ABS resin and extruded, and used as a heat resistant ABS resin composition. The blended AS resin or ABS resin, or the other additives or polymers are not particularly limited. The heat resistant ABS resin is preferably used in various applications such as car interior and exterior parts and domestic electric appliances, besides general merchandise.

In addition, in the case of using the heat resistant ABS resin composition as a molded product, the molding method is not particularly limited, specific examples of the molding method include injection molding, extrusion molding, blow molding, calendar molding, and transfer molding, and the injection molding is preferable from the standpoint of productivity.

EXAMPLES

In order to describe the method for producing a thermoplastic copolymer according to the present invention more specifically, examples will be given and described below. First, methods for analyzing resin characteristics of thermoplastic copolymers will be described below.

(1) The Degree of Polymerization

The concentration (weight %) was determined by gas chromatograph for unreacted monomers in a polymerization solution of a copolymer and a remaining vinyl monomer compound (a) and in a prepared raw material solution, and the degree of polymerization was calculated in accordance with the following formula.

The Degree of Polymerization=$100 \times (1-M1/M0)$

It is to be noted that the respective symbols denote the following numerical values.

M1=the concentration of the unreacted monomer in the polymerization solution (weight %)

M0=the concentration of the monomer in the prepared raw material solution (weight %)

(2) The Remaining Amount of N-Substituted Maleimide

Each 2 g of copolymers prior to a volatilizing step was dissolved in 20 g of acetone, the remaining unreacted N-substituted maleimide monomer was quantified by gas chromatograph GC-14A from Shimadzu Corporation, and the content was calculated in accordance with the following formula.

Component Content (ppm)=$\{\alpha/P1\} \times 1000000$

It is to be noted that the respective symbols denote the following numerical values.

$\alpha$=the weight of the remaining N-substituted maleimide quantified by gas chromatograph (g)

P1=the weight of the sampled polymerization solution (g)

(3) Polymer Generation Rate

The polymer generation rate was calculated in accordance with the following formula, assuming that the amount of the reactive monomer (a) supplied is denoted by X1 (kg/h), the amount of the copolymer (A) discharged from the volatilizing apparatus is denoted by X2 (kg/h), and the total residence time of the polymerization solution in a complete mixing tank, tubular reactors, and a volatilizing apparatus is denoted by τ(h).

Reaction Rate (%/h)=(X2/X1)/τ

(4) Weight Average Molecular Weight and Molecular Weight Distribution of Copolymer (A)

As a measurement sample, 10 mg of the obtained copolymer (A) was dissolved in 2 g of tetrahydrofran. Gel permeation chromatograph (pump: 515 type from Waters, column: TSK-gel-GMHXL from Tosoh Corporation) provided with a DAWN-DSP type multi-angle light scattering photometer (from Wyatt Technology) was used with tetrahydrofran as a solvent to measure the weight average molecular weight Mw (absolute molecular weight) and the number average molecular weight Mn (absolute molecular weight) under the conditions of a temperature of 30° C. and a flow velocity of 1.0 mL/minute. The molecular weight distribution was calculated from the weight average molecular weight (absolute molecular weight)/the number average molecular weight (absolute molecular weight).

(5) Color (YI value) of Copolymer (A)

The color (YI value) was measured in accordance with the JIS K7103 (the version in 1977).

(6) Glass Transition Temperature (Tg)

A differential scanning calorimeter (DSC-type 7 from PerkinElmer Co., Ltd.) was used to measure the glass transition temperature (Tg) at a rate of temperature increase of 20° C./min under a nitrogen atmosphere.

(7) Composition Analysis of Each Component $^1$H-NMR was measured at 30° C. in deuterated dimethyl sulfoxide to determine the composition of each copolymer unit.

(8) Bleeding

The obtained copolymer (A) pellet of 15 g was dried at 80° C. for 3 hours, and then placed on a hot plate at 270° C. provided underneath. Spacers were used to make an adjustment so that the gap of an upper plate was 4 mm, and the upper plate was removed after heating for 10 minutes. The bleed adhering to the upper plate was weighed to obtain the bleeding (weight %) contained in 15 g of the sample.

Example 1

The continuous polymerization apparatus shown in FIG. 1 was used to supply a monomer mixture according to the following formula continuously from the plunger pump (1) at a rate of 5.75 kg/h (5.0 kg/h of monomers and 0.75 kg/h of methyl ethyl ketone). The loop reactor is composed of tubular reactors with an internal diameter of 2.5 inches (a SMX-type static mixer with 30 static mixing elements built therein and with a heat transfer area 130 m$^2$/m$^3$, from Gebruder Sulzer Ltd in Switzerland) (2), (3) and of a gear pump (4) for circulating a mixed solution. The reflux ratio (R=F1/F2) was 20. Continuous polymerization was carried out with the polymerization temperature of the loop reactor (I): 110° C.; the inner wall temperature of the reactors (2), (3): 115° C.; and the average residence time: 1 hour. The degree of polymerization was 70 weight %.

The plug flow reactor (II) was composed of tubular reactors (6), (7) with an internal diameter of 2.5 inches, and the inner wall temperature of the tubular reactors (6), (7) was 135° C., the polymerization temperature was 130° C., and the residence time was 30 minutes. The degree of polymerization for the polymerization solution at the outlet of the tubular reactor (7) was 84 weight %, and the amount of the remaining N-phenyl maleimide was 1500 ppm.

| | |
|---|---|
| Acrylonitrile | 12.3 weight % |
| Styrene | 51.2 weight % |
| N-phenyl maleimide | 36.5 weight % |
| (hereinafter, with respect to 100 parts by weight of monomer mixture) | |
| Methyl ethyl ketone | 15.0 parts by weight |
| 1,1'-bis(t-butylperoxy)cyclohexane | 0.005 parts by weight |
| n-octylmercaptan | 0.10 parts by weight |

Subsequently, the polymerization solution was supplied to the heat exchanger (8) and volatilizing tank (9) heated to 260° C., in which a volatilizing reaction was developed at a pressure of 20 Torr for 30 minutes, thereby obtaining a thermoplastic copolymer (A-1) in the shape of a pellet. The amount of the obtained polymer was 4.2 kg/h, the total residence time was 2 hour, and the polymer generation rate was 42%/h. This copolymer (A-1) had Mw of 120000 and Mw/Mn of 1.5.

Example 2

Continuous polymerization was carried out with the same formula as in Example 1, except that 1,1'-bis(t-butylperoxy) cyclohexane was not used. The degree of polymerization in the loop reactor (I) was 65 weight %, the inner wall temperature of the plug flow reactor (II) was 140° C., the polymerization temperature was 135° C., the degree of polymerization was 84 weight %, and the amount of the remaining N-phenyl maleimide was 2000 ppm. The volatilizing reaction was developed in the same way as in Example 1. The amount of the obtained polymer was 4.2 kg/h, and the polymer generation rate was 42%/h. This copolymer (A-2) had Mw of 115000 and Mw/Mn of 1.4.

Example 3

Continuous polymerization was carried out with the same formula as in Example 1, except that 9 parts by weight of acrylonitrile, 55 parts by weight of styrene, and 36 parts by weight of N-phenyl maleimide were used. The degree of polymerization in the loop reactor (I) was 65 weight %, the degree of polymerization in the plug flow reactor (II) was 88 weight %, and the amount of the remaining N-phenyl maleimide was 1000 ppm. The amount of the obtained polymer was 4.4 kg/h, and the polymer generation rate was 44%/h. This copolymer (A-3) had Mw of 110000 and Mw/Mn of 1.5.

Example 4

Loop Reactor

Continuous polymerization was carried out with the same formula as in Example 1, except that 0.17 parts by weight of n-octylmercaptan was used. The amount of the obtained polymer was 4.2 kg/h, and the polymer generation rate was 42%/h. This copolymer (A-4) had Mw of 85000 and Mw/Mn of 1.5.

Example 5

Continuous polymerization was carried out with the same formula as in Example 1, except that methyl ethyl ketone as an organic solvent or 1,1'-bis(t-butylperoxy)cyclohexane was not used. The monomer mixture was supplied continuously at a rate of 10 kg/h. In the loop reactor (I), the average residence time was 35 minutes, and the degree of polymerization was 70 weight %. In the plug flow reactor (II), the inner wall temperature was 135° C., the polymerization temperature was 130° C., the average residence time was 17 minutes, the degree of polymerization was 85 weight %, and the amount of the remaining N-phenyl maleimide was 700 ppm. Subsequently, the volatilizing reaction was developed to obtain a thermoplastic copolymer (A-5) in the shape of a pellet. The amount of the obtained polymer was 8.5 kg/h, the total residence time was 1.37 hours, and the polymer generation rate was 62%/h. This copolymer (A-5) had Mw of 120000 and Mw/Mn of 1.5.

Example 6

Continuous polymerization was carried out under the same conditions as in Example 1, except that the polymerization solution was supplied to a volatilizing tank heated to 260° C. to develop a volatilizing reaction at a pressure of 250 Torr for 120 minutes. The polymer generation rate was 24%/h, and the obtained pellet exhibited a yellow color because of its residence in the volatilizing reactor at the high temperature for the long period of time. This copolymer (A-6) had Mw of 170000 and Mw/Mn of 2.3.

Example 7

Continuous polymerization was carried out under the same conditions as in Example 1, except that the MEK amount was 50 parts by weight. The monomer mixture was continuously supplied at a rate of 7.5 kg/h (5.0 kg/h of monomers and 2.5 kg/h of methyl ethyl ketone). In the loop reactor (I), the average residence time was 45 minutes, and the degree of polymerization was 30 weight %.

In the plug flow reactor (II), the polymerization temperature was 130° C., the average residence time was 23 minutes, the degree of polymerization was 40 weight %, and the amount of the remaining N-phenyl maleimide was 15000 ppm. The volatilizing reaction was developed for 60 minutes to obtain a thermoplastic copolymer (A-7) in the shape of a pellet. The amount of the obtained polymer was 2.0 kg/h, and the obtained pellet exhibited a yellow color. The total residence time was 2.1 hours, and the polymer generation rate was 19%/h. This copolymer (A-7) had Mw of 40000 and Mw/Mn of 2.2.

Comparative Example 1

Complete Mixing Tank

Continuous polymerization was carried out by continuously supplying a monomer mixture with the following formula, bubbled with a nitrogen gas of 20 L/minute for 15 minutes, to a 20 liter stainless autoclave provided with a double-helical stirring wing at a rate of 5 kg/h (5.0 kg/h of monomers and 0.75 kg/h of methyl ethyl ketone), stirring at 50 rpm and controlling the internal temperature to 110° C. with an average residence time of 2 hours. The degree of polymerization was 70 weight %, and the amount of the remaining N-phenyl maleimide was 30000 ppm.

| | |
|---|---|
| Acrylonitrile | 12.3 weight % |
| Styrene | 51.2 weight % |
| N-phenyl maleimide | 36.5 weight % |
| (hereinafter, with respect to 100 parts by weight of monomer mixture) | |
| Methyl ethyl ketone | 15.0 parts by weight |
| 1,1'-bis(t-butylperoxy)cyclohexane | 0.01 parts by weight |
| n-octylmercaptan | 0.20 parts by weight |

Subsequently, the polymerization solution was supplied to a volatilizing tank heated to 260° C., in which a volatilizing reaction was developed at a pressure of 20 Torr for 30 minutes, thereby obtaining a thermoplastic copolymer (A-6) in the shape of a pellet. A large amount of N-phenyl maleimide remained in the volatilizing piping, and the line was obstructed in 24 hours after starting the test. This copolymer (A-8) had Mw of 40000 and Mw/Mn of 1.5. The obtained pellet exhibited a yellow color because of the remaining imide monomer.

Comparative Example 2

Complete Mixing Tank

Continuous polymerization was carried out by continuously supplying a monomer mixture with the following formula, bubbled with a nitrogen gas of 20 L/minute for 15 minutes, to a 20 liter stainless autoclave provided with a double-helical stirring wing at a rate of 5.75 kg/h, stirring at 50 rpm and controlling the internal temperature to 110° C. with an average residence time of 2 hours. The degree of polymerization was 70 weight %. The stainless autoclave provided with the double-helical stirring wing is a complete mixing type reactor.

| | |
|---|---|
| Acrylonitrile | 12.3 weight % |
| Styrene | 51.2 weight % |
| N-phenyl maleimide | 36.5 weight % |
| (hereinafter, with respect to 100 parts by weight of monomer mixture) | |
| Methyl ethyl ketone | 15.0 parts by weight |
| 1,1'-bis(t-butylperoxy)cyclohexane | 0.005 parts by weight |
| n-octylmercaptan | 0.20 parts by weight |

Then, the polymerization solution obtained in the previous polymerization step was continuously extracted, and a gear pump was used to supply the extracted polymerization solution continuously to tubular reactors with an internal diameter of 2.5 inches (a SMX-type static mixer with 30 static mixing elements built therein and with a heat transfer area 130 $m^2/m^3$, from Gebruder Sulzer Ltd in Switzerland), thereby carrying out a polymerization reaction. In the tubular reactors in this case, the polymerization temperature was 130° C., the average residence time was 30 minutes, the degree of polymerization was 84 weight %, and the amount of the remaining N-phenyl maleimide was 1500 ppm. The tubular reactors were arranged in series with the stainless autoclave provided with the double-helical stirring wing.

Subsequently, the polymerization solution was supplied to a volatilizing tank heated to 260° C., in which a volatilizing reaction was developed at a pressure of 20 Torr for 30 minutes, thereby obtaining a thermoplastic copolymer (A-9) in the shape of a pellet. The amount of the obtained polymer was 4.2 kg/h, the total residence time was 3 hour, and the polymer generation rate was 28%/h. This copolymer (A-9) had Mw of 120000 and Mw/Mn of 1.5.

Table 1 shows the conditions for producing the thermoplastic copolymers according to Examples 1 to 7 and Comparative Examples 1 and 2 described above, whereas Table 2 shows properties of the obtained thermoplastic copolymers.

TABLE 1

| | Polymerization Method | Composition of Prepared Monomers (wt %) ST | NPMI | AN | Organic Solvent (wt %) | Radical Initiator (wt parts) | Chain Transfer Agent (wt parts) | First Stage Polymerization Polymerization Apparatus | Polymerization Temperature (°C.) | Residence Time (h) | Degree of Polymerization (%) | Second Stage Polymerization Polymerization Apparatus |
|---|---|---|---|---|---|---|---|---|---|---|---|---|
| Example 1 | Solution Polymerization | 51.2 | 36.5 | 12.3 | MEK 15 wt parts | 0.005 | 0.1 | Loop Tubular Reactor | 110 | 1.0 | 70 | Plug Flow Reactor |
| Example 2 | Solution Polymerization | 51.2 | 36.5 | 12.3 | MEK 15 wt parts | — | 0.1 | Loop Tubular Reactor | 110 | 1.0 | 65 | Plug Flow Reactor |
| Example 3 | Solution Polymerization | 55 | 36 | 9 | MEK 15 wt parts | 0.005 | 0.1 | Loop Tubular Reactor | 110 | 1.0 | 65 | Plug Flow Reactor |
| Example 4 | Solution Polymerization | 51.2 | 36.5 | 12.3 | MEK 15 wt parts | 0.005 | 0.17 | Loop Tubular Reactor | 110 | 1.0 | 70 | Plug Flow Reactor |
| Example 5 | Bulk Polymerization | 51.2 | 36.5 | 12.3 | — | — | 0.1 | Loop Tubular Reactor | 110 | 0.58 | 70 | Plug Flow Reactor |
| Example 6 | Solution Polymerization | 51.2 | 36.5 | 12.3 | MEK 15 wt parts | 0.01 | 0.1 | Loop Tubular Reactor | 110 | 1.0 | 60 | Plug Flow Reactor |
| Example 7 | Solution Polymerization | 51.2 | 36.5 | 12.3 | MEK 50 wt parts | 0.005 | 0.1 | Loop Tubular Reactor | 110 | 0.8 | 30 | Plug Flow Reactor |
| Comparative Example 1 | Solution Polymerization | 51.2 | 36.5 | 12.3 | MEK 15 wt parts | 0.01 | 0.1 | Complete Mixing Tank | 110 | 2.0 | 70 | Not Used |
| Comparative Example 2 | Solution Polymerization | 51.2 | 36.5 | 12.3 | MEK 15 wt parts | 0.005 | 0.2 | Complete Mixing Tank | 110 | 2.0 | 70 | Plug Flow Reactor |

| | Second Stage Polymerization Polymerization Temperature (°C.) | Residence Time (h) | Degree of Polymerization (%) | Amount of Remaining NPMI (%) | Volatilizing Apparatus Volatilizing Temperature (°C.) | Degree of Vacuum (Torr) | Residence Time (h) | Total Residence Time (h) | Polymer Generation Rate (%/h) | Type of Copolymerization Solution (a) |
|---|---|---|---|---|---|---|---|---|---|---|
| Example 1 | 130 | 0.5 | 84 | 1500 | 260 | 20 | 0.5 | 2.0 | 42 | A-1 |
| Example 2 | 135 | 0.5 | 84 | 2000 | 260 | 20 | 0.5 | 2.0 | 42 | A-2 |
| Example 3 | 130 | 0.5 | 88 | 1000 | 260 | 20 | 0.5 | 2.0 | 44 | A-3 |
| Example 4 | 130 | 0.5 | 84 | 1500 | 260 | 20 | 0.5 | 2.0 | 42 | A-4 |
| Example 5 | 130 | 0.29 | 85 | 700 | 260 | 20 | 0.5 | 1.38 | 62 | A-5 |
| Example 6 | 130 | 0.5 | 84 | 1000 | 260 | 250 | 2.0 | 3.5 | 24 | A-6 |
| Example 7 | 130 | 0.38 | 40 | 15000 | 260 | 20 | 1.0 | 2.1 | 19 | A-7 |
| Comparative Example 1 | Not Used | | | 30000 | 260 | 20 | 0.5 | Degassing Line Obstructed | | A-8 |
| Comparative Example 2 | 130 | 0.5 | 84 | 1500 | 260 | 20 | 0.5 | 3.0 | 28 | A-9 |

ST: styrene
AN: acrylonitrile
NPMI: N-phenyl maleimide
MEK: methylethylketone

TABLE 2

| | Type of Thermoplastic Copolymer (A) | Polymer Composition ST unit | NPMI unit | AN unit | Weight Average Molecular Weight | Molecular Weight Distribution | Color (YI Value) | Tg (°C.) | Bleeding (wt %) |
|---|---|---|---|---|---|---|---|---|---|
| Example 1 | (A-1) | 50 | 40 | 10 | 120000 | 1.5 | 28 | 151 | 0.03 |
| Example 2 | (A-2) | 53 | 39 | 8 | 115000 | 1.4 | 32 | 150 | 0.02 |
| Example 3 | (A-3) | 56 | 40 | 4 | 110000 | 1.5 | 37 | 149 | 0.02 |

TABLE 2-continued

| Type of Thermoplastic Copolymer (A) | Polymer Composition | | | Weight Average Molecular Weight | Molecular Weight Distribution | Color (YI Value) | Tg (° C.) | Bleeding (wt %) |
| | ST unit | NPMI unit | AN unit | | | | | |
| --- | --- | --- | --- | --- | --- | --- | --- | --- |
| Example 4 | (A-4) | 54 | 39 | 7 | 85000 | 1.5 | 35 | 149 | 0.03 |
| Example 5 | (A-5) | 55 | 37 | 8 | 120000 | 1.5 | 34 | 150 | 0.02 |
| Example 6 | (A-6) | 55 | 40 | 5 | 170000 | 2.3 | 55 | 146 | 0.08 |
| Example 7 | (A-7) | 56 | 42 | 5 | 40000 | 2.2 | 45 | 138 | 0.18 |
| Comparative Example 1 | (A-8) | 56 | 41 | 3 | 40000 | 1.5 | 50 | 142 | 0.2 |
| Comparative Example 2 | (A-9) | 50 | 40 | 10 | 120000 | 1.5 | 30 | 151 | 0.03 |

As is clear from the results of Examples 1 to 7, as for the thermoplastic copolymers obtained in accordance with the process for producing a thermoplastic polymer according to the present invention, the piping was not obstructed in the volatilizing step, resulting in the thermoplastic copolymers with the smaller amount of remaining N-substituted maleimide. In particular, the methods for producing a thermoplastic copolymer according to Examples 1 to 5 provide excellent production efficiencies, and solve the problems in terms of handleability, and furthermore, the obtained thermoplastic copolymers were superior to the comparative examples in terms of all of molecular weight, molecular weight distribution, color (YI value), mold staining of a molding machine (bleeding), and heat resistance (glass transition temperature).

Comparative Examples 1 and 2 involve no loop reactor, and thus differ from the production methods according to the present invention. In Comparative Example 1, the piping was obstructed in the volatilizing step, due to the remaining N-substituted maleimide. In addition, Comparative Example 2 was inferior to Example 1 in polymer generation rate, in the case of producing the thermoplastic copolymer with the same composition as in Example 1, which shows that the method for producing a thermoplastic copolymer according to the present invention has excellent productivity.

INDUSTRIAL APPLICABILITY

The thermoplastic copolymer obtained in accordance with the method for producing a thermoplastic copolymer according to the present invention is blended with an AS resin or an ABS resin and extruded, and widely used as a heat resistant ABS resin composition in car interior and exterior parts and domestic electric appliances and the like.

The invention claimed is:

1. A method for producing a thermoplastic copolymer, the method comprising supplying a monomer mixture (a) to a loop reactor continuously to produce a copolymer (A), the monomer mixture (a) comprising an aromatic vinyl monomer (a1), a vinyl cyanide monomer (a2) and an N-substituted maleimide monomer (a3).

2. The method for producing a thermoplastic copolymer according to claim 1, further comprising supplying the copolymer (A) continuously to an extrusion flow reactor composed of one or more tubular reactors with a structure for static mixing and reacting the copolymer (A) until a degree of polymerization for the copolymer (A) is 50 to 90 weight %, after the supplying the monomer mixture (a) to the loop reactor continuously to produce the copolymer (A).

3. The method for producing a thermoplastic copolymer according to claim 1, further comprising supplying a solution containing the copolymer (A) to a continuous volatilizing apparatus, the copolymer (A) comprising the aromatic vinyl monomer (a1), the vinyl cyanide monomer (a2) and the N-substituted maleimide monomer (a3), and continuously volatilizing the copolymer (A) under a reduced pressure with a pressure of 200 Torr or less at a temperature of 100° C. or more and less than 300° C. to separate and remove an unreacted raw material from the copolymer (A).

4. The method for producing a thermoplastic copolymer according to claim 1, wherein a degree of polymerization for the copolymer (A) is 30 to 80 weight %.

5. The method for producing a thermoplastic copolymer according to claim 1, wherein the loop reactor comprises a circulation line including one or more tubular reactors with a structure for static mixing therein.

6. The method for producing a thermoplastic copolymer according to claim 5, wherein the tubular reactor with a structure for static mixing therein includes a structure with a multiple-unit curved tube, and has 50 $m^2/m^3$ or more of a heat transfer area per unit volume of the tubular reactor.

7. The method for producing a thermoplastic copolymer according to claim 2, wherein a content of the N-substituted maleimide monomer in a mixture of the copolymer (A) and an unreacted raw material is 1.0% or less during the reacting the copolymer (A) until the degree of polymerization for the copolymer (A) is 50 to 90 weight %.

8. The method for producing a thermoplastic copolymer according to claim 1, wherein 1 to 30 parts by weight of a polar solvent is used with respect to 100 parts by weight of the monomer mixture (a).

9. The method for producing a thermoplastic copolymer according to claim 1, wherein an amount of a chain transfer agent added is 0.05 to 0.30 parts by weight with respect to 100 parts by weight of the monomer mixture (a).

10. The method for producing a thermoplastic copolymer according to claim 1, wherein the copolymer (A) comprises 20 to 80 weight % of an aromatic vinyl unit, 3 to 30 weight % of a vinyl cyanide unit, and 10 to 50 weight % of an N-substituted maleimide unit.

11. The method for producing a thermoplastic copolymer according to claim 2, wherein a weight average molecular weight Mw of the copolymer (A) is 50,000 to 130,000, and a ratio Mw/Mn of the weight average molecular weight Mw to a number average molecular weight Mn is 2 or less after the reacting the copolymer (A) until the degree of polymerization for the copolymer (A) is 50 to 90 weight %.

* * * * *